(12) United States Patent
Hosoi

(10) Patent No.: US 6,400,490 B1
(45) Date of Patent: Jun. 4, 2002

(54) MACH-ZEHNDER OPTICAL MODULATOR

(75) Inventor: Toru Hosoi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/717,313

(22) Filed: Nov. 22, 2000

(30) Foreign Application Priority Data

Nov. 25, 1999 (JP) ........................................... 11-334655

(51) Int. Cl.$^7$ .............................. G02F 1/03; G02F 1/01
(52) U.S. Cl. .............................. 359/254; 385/1; 385/2; 385/3; 385/39; 385/40; 385/41
(58) Field of Search ............................ 385/1–3, 39–41; 359/238, 245, 246, 248, 254, 276, 279; 356/345

(56) References Cited

U.S. PATENT DOCUMENTS

| | | | | |
|---|---|---|---|---|
| 4,196,964 A | * | 4/1980 | Papuchon | 350/96.14 |
| 5,111,517 A | * | 5/1992 | Riviere | 385/11 |
| 5,249,243 A | * | 9/1993 | Skeie | 385/3 |
| 6,091,864 A | * | 7/2000 | Hofmeister | 385/2 |

FOREIGN PATENT DOCUMENTS

| | | |
|---|---|---|
| JP | 5-297333 | 11/1993 |
| JP | 2564999 | 10/1996 |
| JP | 5-297332 | 11/1998 |

* cited by examiner

*Primary Examiner*—Hung Xuan Dang
*Assistant Examiner*—Tuyen Tra
(74) *Attorney, Agent, or Firm*—McGinn & Gibb, PLLC

(57) ABSTRACT

An optical modulator is provided that not only can realize a suitable initial operating point without using dc voltage for control, but that has little optical loss and can obtain an excellent extinction ratio. The optical modulator comprises: a substrate having an electro-optical effect, first and second branch optical waveguides formed in a first major surface of the substrate; an optical branching structure for splitting input optical signal and supplying the split signals to the branch optical waveguides; and a 3-dB directional coupler that couples the outputs of the first and second branch optical waveguides. The ratio of nonuniformity, which is represented by the difference in propagation constants of the two optical waveguides in 3-dB directional coupler, to the coupling coefficient of the 3-dB directional coupler is 1 to at least 5, preferably 1 to at least 15, and still more preferably, 1 to at least 20.

24 Claims, 14 Drawing Sheets

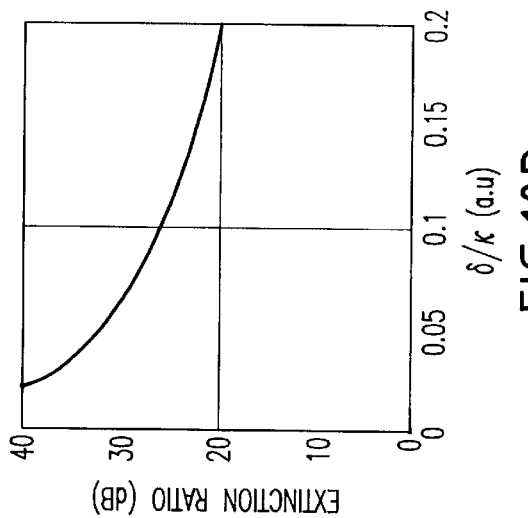
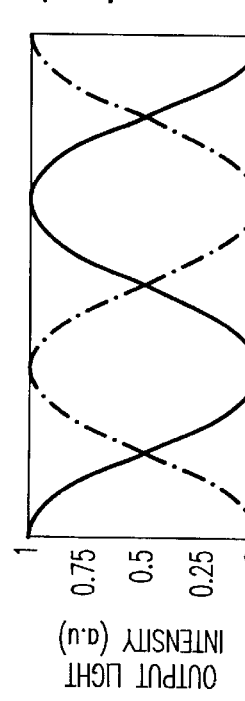
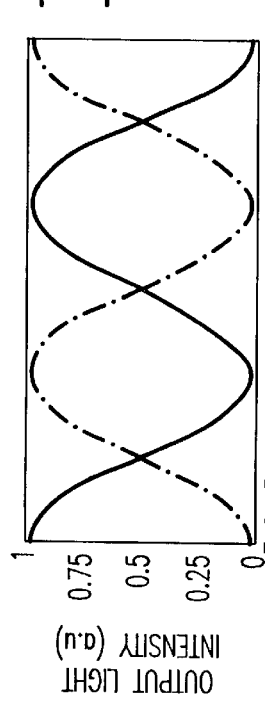
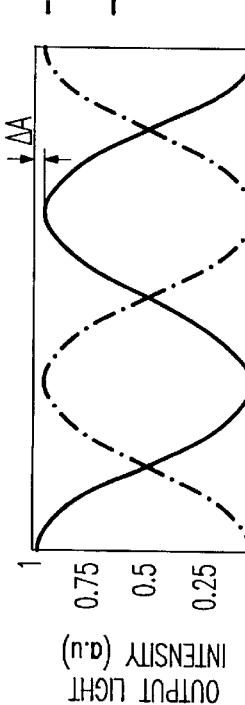

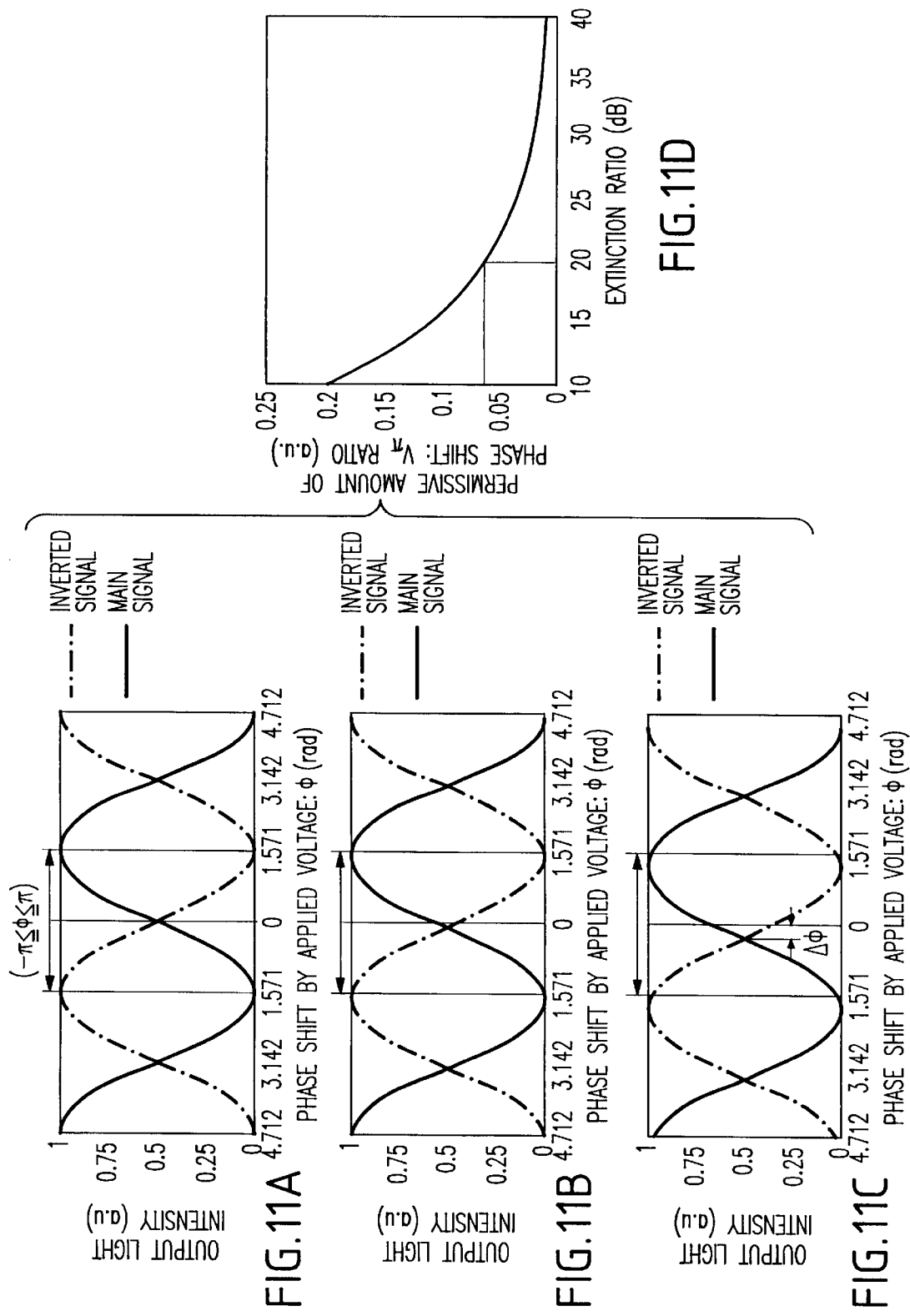

MACH-ZEHNDER OPTICAL MODULATOR

BACKGROUND OF THE INVENTION

1. Field of the Invention

The present invention relates to an optical modulator used in an optical communication system, and particularly to a Mach-Zehnder optical modulator.

2. Description of the Related Art

In the field of optical communication systems that are capable of transmitting a large volume of information, further improvements in transmission rates are considered crucial, and high-speed modulators are considered to be key devices for improving transmission rates.

One optical modulator that is capable of high-speed modulation has an optical waveguide structure that uses a Mach-Zehnder interference system. Such a Mach-Zehnder optical modulator is frequently used particularly as an external modulator in ultra-high-speed communication systems not only because it is capable of canceling the in-phase component in the noise component by applying drive voltage in a push-pull mode, but is also stable with respect to disturbance and can obtain modulation characteristics featuring excellent S/N (signal-to-noise ratio).

In a Mach-Zehnder optical modulator, input light is split into two beams which each undergoes phase modulation and then are combined. In this way, modulation of light intensity is effected by mutual interference. A Mach-Zehnder optical modulator is normally constructed such that the phase difference between the two optical waveguides that propagate the split beams is 0 when voltage is not being applied. In this type of optical modulator, therefore, input light is outputted without change when the applied voltage is 0, and the intensity of the output light varies as a cosine curve as voltage is applied. When operating this type of optical modulator, however it is desirable for the radiated light intensity to vary linearly with respect to the intensity of the electric field that is applied from the outside. For this reason, the initial operating point in a Mach-Zehnder optical modulator is typically set to a position where the phase is shifted by $\pi/2$ radian (90 degrees).

Referring now to FIG. 1A, in which is shown the construction of a typical Mach-Zehnder optical modulator, imbedded optical waveguide 82 is provided in optical substrate 81, which has an electro-optical effect. In optical waveguide 82, input waveguide 82a is branched into two optical waveguides 82b and 82c by way of the Y-shaped branching portion, following which branch optical waveguides 82b and 82c are joined by way of the Y-shaped combining portion, thereby constituting a Mach-Zehnder interference system waveguide. Optical buffer layer 89 and a travelling wave electrode 84 of a prescribed pattern are further provided on branch optical waveguides 82b and 82c.

In this optical modulator, linearly single polarized light that is applied to input waveguide 82a is equally divided at the Y-shaped branching portion and advances into optical waveguides 82b and 82c. At this time, electric fields that are generated in optical waveguides 82b and 82c by applying voltage to travelling wave electrodes 84 as shown in FIG. 1B are applied to optical waveguides 82b and 82c in mutually opposite vertical directions. As a result, the refractive indexes of each of optical waveguides 82b and 82c change due to the electro-optical effect of optical substrate 81, the change in refractive index in each of optical waveguides 82b and 82c being equal in amount and acting oppositely according to the positive and negative sign. The phase modulation due to the change in refractive index thus works in a push-pull manner on optical waveguides 82b and 82c.

The light waves that receive the phase modulation ($\pm\phi/2$) of these optical waveguides 82b and 82c are combined by the Y-shaped combining portion, mutually interfere, and then proceed to output waveguide 82d to be outputted from the output terminal. In this case, the intensity of the output light is altered by $\cos^2(\phi/2)$ with respect to the total amount of phase modulation $\phi$. For example, when light waves that are guided by optical waveguides 82b and 82c are subject to combination/interference, output is at a maximum when the light waves are of the same phase ($\phi=2n\pi$) and at a minimum when of the opposite phase ($\phi=(2n+1)\pi$). In this case, n is an integer such as 0, 1, 2 . . .

Typically, when carrying out light intensity modulation in the Mach-Zehnder interference optical modulator shown in FIG. 1A, the initial operating point is preferably set to an intermediate position ($\pi/2$ phase state) between the maximum output and the minimum output. A device has therefore been proposed in which dc power supply 85 and bias circuit 86 are provided in addition to high-frequency power supply 87 as shown in FIG. 2A in order to allow regulation of the initial operating point. According to this configuration, a direct current (dc) voltage for setting bias is applied to travelling wave electrode 84 in addition to the modulation signal voltage (ac voltage), which is the driving voltage, whereby the refractive index of the optical waveguide changes due to the electro-optical effect of the optical substrate and the phase shifts. FIG. 2B shows the output characteristic in this optical modulator when the dc voltage is 0.

As another method in which the initial operating point of an optical modulator is adjusted to $\pi/2$ phase state, Japanese Patent Laid-open No. 297332/93 (JP, 05297332, A) discloses a device in which the two branch optical waveguides that constitute a Mach-Zehnder interference system are formed with slightly differing lengths, thus producing a difference in the lengths of the optical paths between these two optical waveguides that is on the optical wavelength order.

As yet another known method of adjusting the initial operating point of an optical modulator, the width of the two optical waveguides that constitute a Mach-Zehnder interference system may be varied in portions to produce a non-symmetrical shape, thereby bringing about a difference in the effective refractive index and shifting the initial operating point (Tsuchiya, Kubota, Seino; Papers of the 1992 Autumn Conference, Institute of Electronics, Information and Communication Engineers, C-171). In addition, Japanese Patent No. 2,564,999 (JP, 2564999, B1)(corresponding to Japanese Patent Laid-open No. 24327/92 (JP, 04024327, A)) discloses a method in which the two optical waveguides that constitute a Mach-Zehnder interference system are coupled by a 3-dB directional coupler to shift the optical output by $\pi/2$ radian.

Nevertheless, the above-described optical modulators of the prior art have the following problems:

In an optical modulator in which the adjustment of the initial operating point is performed by applying dc voltage in addition to the modulation signal voltage (ac voltage), a stable modulation characteristic cannot be maintained over a long time period due to change of the operating point with the passage of time, i.e., the dc drift phenomenon. This dc drift phenomenon is often observed when, for example, a lithium nobate ($LiNbO_3$) crystal are used in the optical substrate. Moreover, the bias circuit that is necessary for applying the dc voltage takes up space and adds to the expense of the device. Furthermore, the initial operating point and phase of the output light of the optical modulator can be kept uniform by providing a feedback circuit for correcting the voltage to follow up change in the electric field due to the dc drift phenomenon, thereby stabilizing the modulation characteristic, but taking such measures not only increases cost but adds to the complexity of the circuit configuration.

Optical modulators in which physical differences in the optical paths are created by varying the length or shape of the two optical waveguides that constitute the Mach-Zehnder interference system allow open control for the drive circuit of each optical modulator and thus have real advantages because they have a simplified configuration and have few components in their electrical circuits, but since these optical modulators are constructions for creating phase differences, they also cause differences in optical loss between the two optical waveguides and moreover, the propagation speed of light waves lacks spatial uniformity. Such devices therefore suffer from problems such as: deterioration in extinction ratio, i.e., the ratio of maximum value to minimum value of emitted light intensity; decrease in the emitted light intensity; and further, the occurrence of divergence in speed matching between microwaves and light waves.

A device in which the two optical waveguides that make up the Mach-Zehnder interference system are joined by a 3-dB directional coupler can be expected to provide a solution for each of the above-described problems, but it has been found based on the results of experimentation thus far that such a device suffers from the problems that the extinction ratio deteriorates and the initial operating point diverges from a $\pi/2$ phase state when a difference occurs between the propagation constants of the two optical waveguides.

In addition to the problems described in the foregoing explanation, each of the optical modulators of the prior art suffers from the following problems relating to temperature drift:

The material (for example, lithium niobate) that makes up the optical substrate that is used in this type of optical modulator has pyroelectric properties, and if the temperature of the optical substrate rises due to changes in the ambient temperature, the pyroelectric effect produces a polarization charge in the substrate surface. This polarization charging disrupts the uniformity of the electric field that is applied to the two branch optical waveguides that make up the Mach-Zehnder interference system, thereby causing a change in the refractive index of the two optical waveguides. As a result, a stable modulation characteristic cannot be maintained.

The optical substrate also possesses piezoelectric properties. An increase in the temperature of the optical substrate gives rise to stress in the substrate, this stress resulting from the temperature dependence of internal stress that is caused by forming an optical buffer layer or surface electrodes. As a result, a polarization charge is also produced on the substrate surface by the piezoelectric effect. As with the above-described pyroelectric effect, a change is produced in the refractive index of the two branching optical waveguides, and stable modulation characteristics cannot be maintained.

Furthermore, the above-described stress that is produced in the optical substrate causes a difference in the optical paths of the two branch optical waveguides, whereby stable modulation characteristics cannot be maintained. This problem of stress is also produced by the difference in the thermal expansion rates of the case and optical substrate.

SUMMARY OF THE INVENTION

It is therefore an object of the present invention to provide an optical modulator that solves the above-described problems, that can realize a suitable initial operating point without using dc voltage for control, and moreover, that has little optical loss and can obtain an excellent extinction ratio.

It is another object of the present invention to provide an optical modulator that can prevent temperature drift.

In an optical modulator that uses optical waveguides based on a Mach-Zehnder interference system, a configuration is adopted in which the two branch optical waveguides that make up the interference system are joined by a 3-dB directional coupler, whereby control can be effected to shift the operating point by $\pi/2$ phase in advance, and ideally, the need to apply a bias voltage can be completely eliminated. A bias-free configuration can thus be realized.

In an optical modulator in which the first and second branch optical waveguides that make up the Mach-Zehnder interference system are joined by a 3-dB directional coupler, the present inventors conducted research and found that the extinction ratio is dependent on the ratio of nonuniformity, which is represented by the difference between the propagation constants of the two optical waveguides that make up the 3-dB directional coupler, to the coupling coefficient of the 3-dB directional coupler. When the practical extinction ratio in the present invention is assumed to be 20 dB, to achieve an extinction ratio of this level, the ratio of the nonuniformity to the coupling coefficient is 1 to at least 5, preferably 1 to at least 15, and still more preferably 1 to at least 20. In contrast to the prior art, no shift occurs in the phase of the output light and initial operating point of the optical modulator of the present invention that is configured as described above, and the modulation characteristics therefore do not become unstable.

The present inventors also found that a bias-free construction can be realized by using a multimode interference (MMI) optical waveguide in place of the 3-dB directional coupler in an optical modulator that uses Mach-Zehnder interference-type optical waveguides. A construction that employs a MMI optical waveguide is free of a problem that is characteristic of a 3-dB directional coupler, this problem being shifting of the initial operating point and phase of the output light of the optical modulator and the resulting instability of modulation characteristics.

For optical modulation in the present invention, it is preferable that a first ground electrode is provided over the first branch optical waveguide, a signal electrode is provided over the second branch optical waveguide, and a second ground electrode is provided at a position symmetrical to that of the first ground electrode such that the signal electrode is interposed between two ground electrodes. By means of this construction, a substantially uniform electric field is generated from the signal electrode to each of the first and second ground electrodes, whereby the electric field that is applied to the first and second branch optical waveguides that constitute the Mach-Zehnder interference system can be made uniform. Adopting a symmetrical configuration of the electrodes also equalizes the effect on each branch optical waveguide that is caused by the stress on the optical substrate that is produced by the load of these electrodes.

In addition, a portion of the second ground electrode can be formed over the optical waveguides that make up the 3-dB directional coupler or over the multimode interference optical waveguide. By adopting this structure, electrodes that are provided to cover the optical waveguide can block the influence of disturbances such as temperature change or charging.

The mutually opposite phase relation or the equal power relation of the two optical outputs that are outputted from the 3-dB directional coupler or the 2-input 2-output multimode interference optical waveguide can be used when modulating light using the optical modulator according to the present invention. In other words, a desired optical output of the two optical outputs can be extracted. The user can select one optical output of the two optical outputs according to necessity, or, if necessary, the user can extract and use both of the optical outputs. This optical modulation method therefore offers a high degree of freedom in design.

The present invention can offer the advantages of lower cost and smaller size because it does not require circuits, such as a power supply for bias dc voltage, a bias circuit, or a feedback circuit, that were necessary in each modulator of the prior art. In addition, the invention allows a reduction in the influence of dc drift and temperature drift and therefore can offer not only stabilized modulation characteristics over a long period of time but has a low level of optical loss and can obtain an excellent extinction ratio. As a result, the present invention can provide an optical modulator with superior reliability that was not available in the prior art. The provision of an optical modulator having both high performance and high reliability can be considered an extremely important merit of the present invention.

The above and other objects, features, and advantages of the present invention will become apparent from the following description based on the accompanying drawings which illustrate examples of preferred embodiments of the present invention.

BRIEF DESCRIPTION OF THE DRAWINGS

FIG. 10A is a view for explaining the tolerance of ratio $\delta/\kappa$ with regard to deterioration in the extinction ratio; this view being a waveform chart showing change in the output light intensity with respect to the input signal voltage of the optical modulator when $\delta/\kappa=0$;

FIG. 10B is a view for explaining the tolerance of ratio $\delta/\kappa$ with regard to deterioration in the extinction ratio; this view being a waveform chart showing change in the output light intensity with respect to the input signal voltage of the optical modulator when $\delta/\kappa=0.2$;

FIG. 10C is a view for explaining the tolerance of ratio $\delta/\kappa$ with regard to deterioration in the extinction ratio; this view being a waveform chart showing change in the output light intensity with respect to the input signal voltage of the optical modulator when $\delta/\kappa=0.5$;

FIG. 10D is a view for explaining the tolerance of ratio $\delta/\kappa$ with regard to deterioration in the extinction ratio; this view being a characteristics chart showing the relation between the extinction ratio and ratio $\delta/\kappa$;

FIG. 11A is a view for explaining the tolerance of ratio $\delta/\kappa$ with regard to phase shift, this view being a waveform chart showing change in output light intensity with respect to the input signal voltage of the optical modulator when $\delta/\kappa=0$;

FIG. 11B is a view for explaining the tolerance of ratio $\delta/\kappa$ with regard to phase shift, this view being a waveform chart showing change in output light intensity with respect to the input signal voltage of the optical modulator when $\delta/\kappa=0.063$;

FIG. 11C is a view for explaining the tolerance of ratio $\delta/\kappa$ with regard to phase shift, this view being a waveform chart showing change in output light intensity with respect to the input signal voltage of the optical modulator when $\delta/\kappa=0.2$;

FIG. 11D is a view for explaining the tolerance of ratio $\delta/\kappa$ with regard to phase shift, this view being a characteristics chart showing the relation between the permissible amount of phase shift or ratio $\delta/\kappa$ and the extinction ratio;

DESCRIPTION OF THE PREFERRED EMBODIMENTS

Figure 1A:
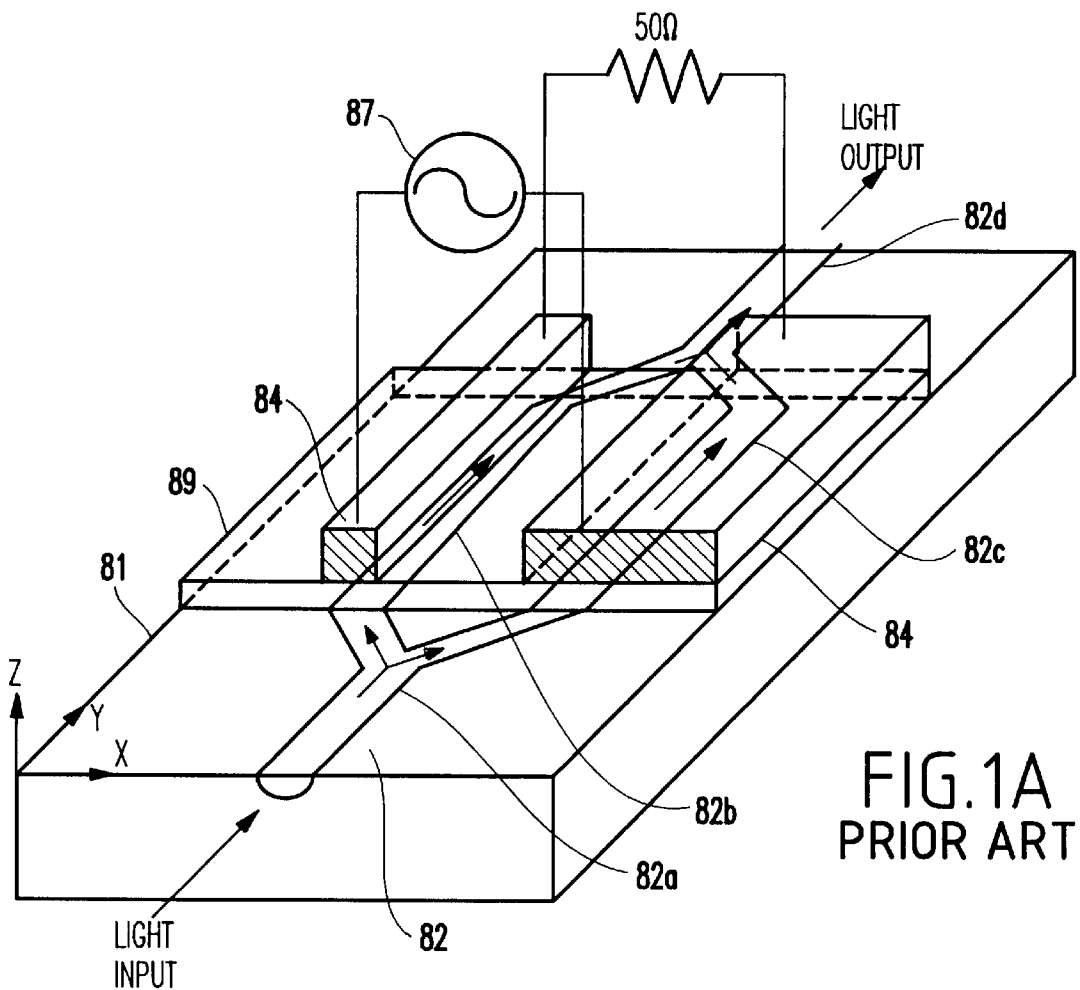
FIG. 1A shows the configuration of a typical Mach-Zehnder optical modulator.
Figure 1B:
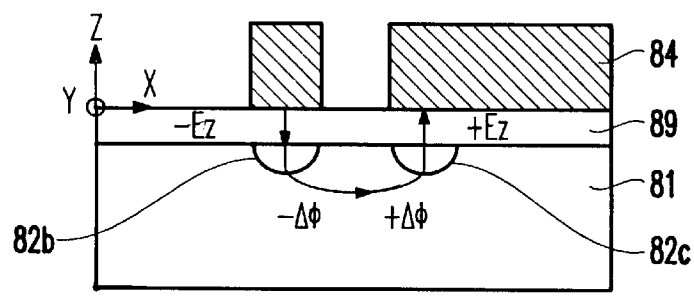
FIG. 1B is a schematic view of the state of an electric field that is applied to the optical waveguides that constitute the optical modulator shown in FIG. 1A.
Figure 2A:
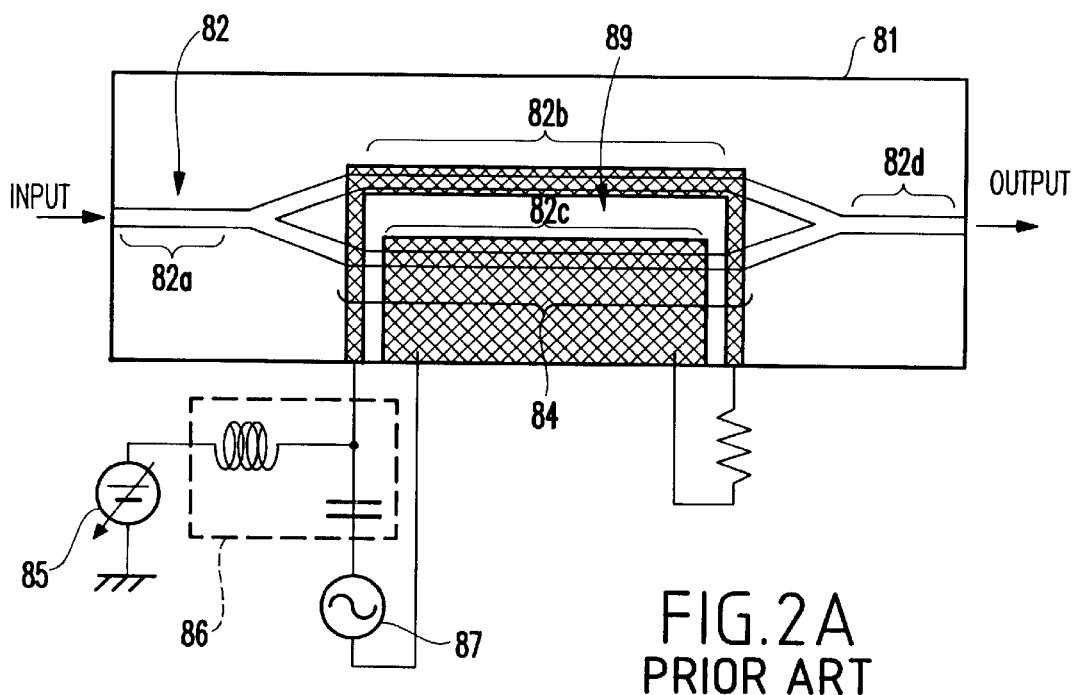
FIG. 2A shows the configuration of a Mach-Zehnder optical modulator of the prior art that allows adjustment of the initial operating point.
Figure 2B:
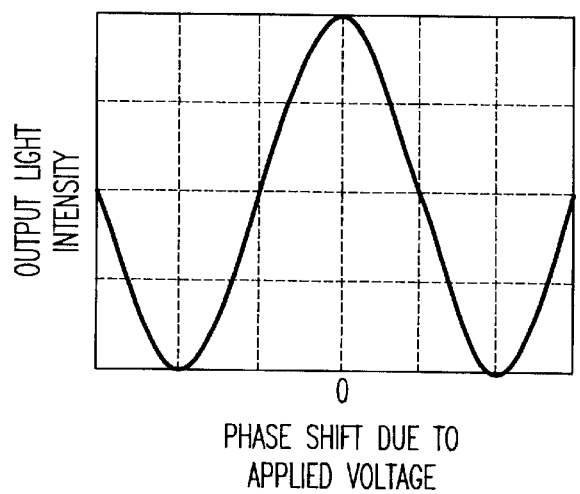
FIG. 2B is a characteristics chart showing the output characteristic when the dc voltage is 0.
Figure 3:
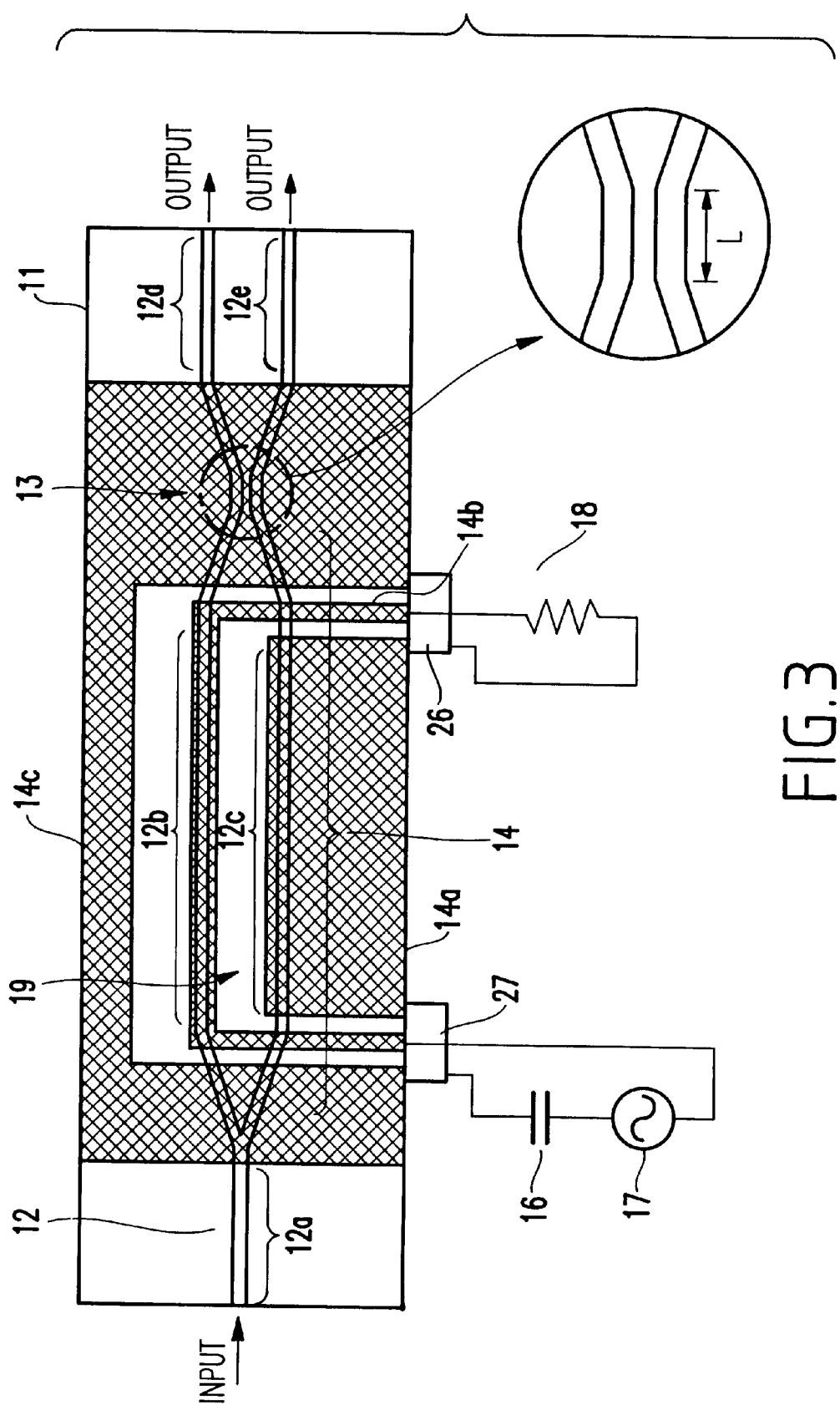
FIG. 3 is a schematic structural view of the optical modulator according to the first embodiment of the present invention.

First Embodiment:

Turning now to FIG. 3, an optical modulator according to the first embodiment of the present invention is shown, this optical modulator having a configuration in which optical waveguide 12 is provided in a surface of optical substrate 11 having an electro-optical effect, and optical buffer layer 19 and travelling-wave electrode 14 of a prescribed pattern are further provided on this optical waveguide 12.

Optical waveguide 12 is a Mach-Zehnder waveguide structure in which input optical waveguide 12a is spit into two branch optical waveguides 12b and 12c by way of a waveguide having a Y-branching structure, and these branch optical waveguides 12b and 12c are in turn connected to output optical waveguides 12d and 12e, respectively, by way of 3-dB directional coupler 13. By means of this configuration, a desired optical output can be extracted as modulated light from the two optical outputs that are outputted from each of output optical waveguides 12d and 12e.

Travelling-wave electrode 14 is made up by: ground electrode 14a that is provided such that a portion overlies branch optical waveguide 12c; signal electrode 14b provided along the outer circumference of electrode 14a such that a portion overlies branch optical waveguide 12b; and another ground electrode 14c provided so as to surround these two electrodes. One end of electrode 14b is connected to electrodes 14a and 14c by way of terminator 18 through coaxial connector 26, and the other end s connected to electrodes 14a and 14c by way of a modulation circuit through another coaxial connector 27. In the modulation circuit, capacitor 16 and high-frequency power supply 17 are connected in a series. Center conductors of coaxial connectors 26 and 27 connect to the one end and the other end of signal electrode 14b, respectively, and ground electrodes 14a and 14c are electrically connected to each other via an outer conductor of each of coaxial connectors 26 and 27.

Figure 4:
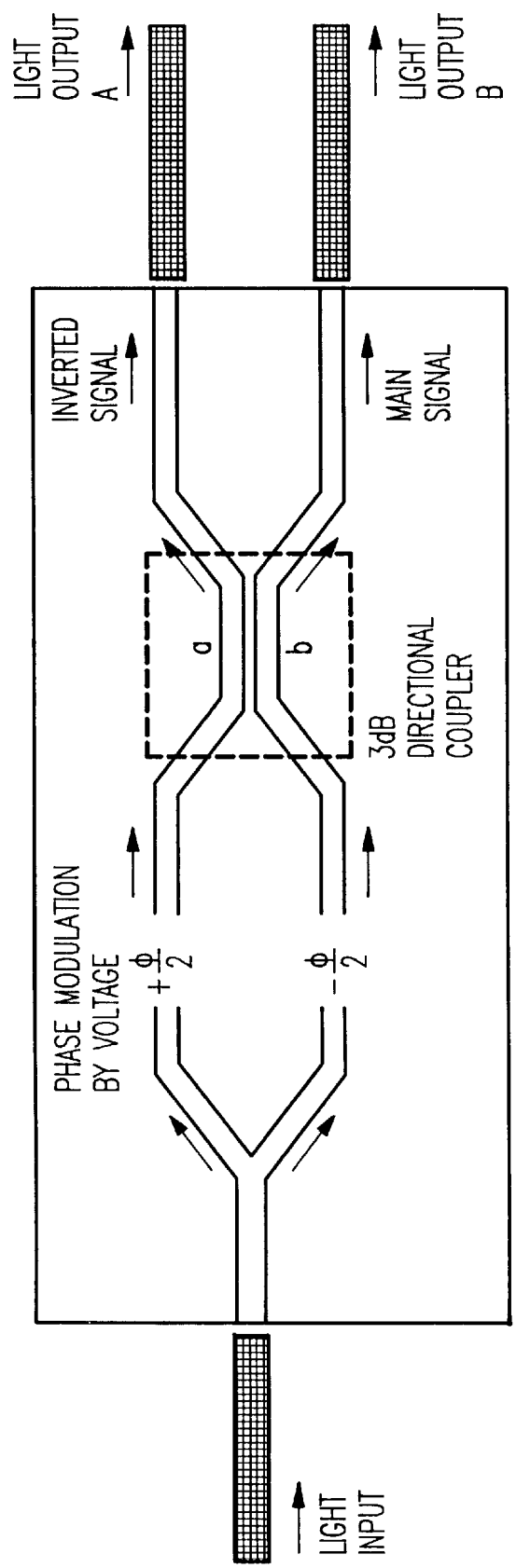
FIG. 4 is a schematic view showing the propagation of light waves in the optical modulator shown in FIG. 3.

Next, regarding the propagation of light waves in this optical modulator, light that is applied to input optical waveguide 12a as shown in FIG. 4 is divided equally at the Y-branching Section and advances into each of branch optical waveguides 12b and 12c. An electric field that is generated by applying a signal voltage to travelling-wave electrode 14 at this time is applied in mutually opposite vertical directions to branch optical waveguides 12b and 12c, and the light waves thus undergo phase modulation ($\pm\phi/2$) in each of branch optical waveguides 12b and 12c. The light waves that have undergone phase modulation in each of branch optical waveguides 12b and 12c are interference-combined at 3-dB directional coupler 13, advance to output optical waveguides 12d and 12e, and are outputted from the output terminal of each waveguide as a main (non-inverted) signal and an inverted signal.

Figure 5:
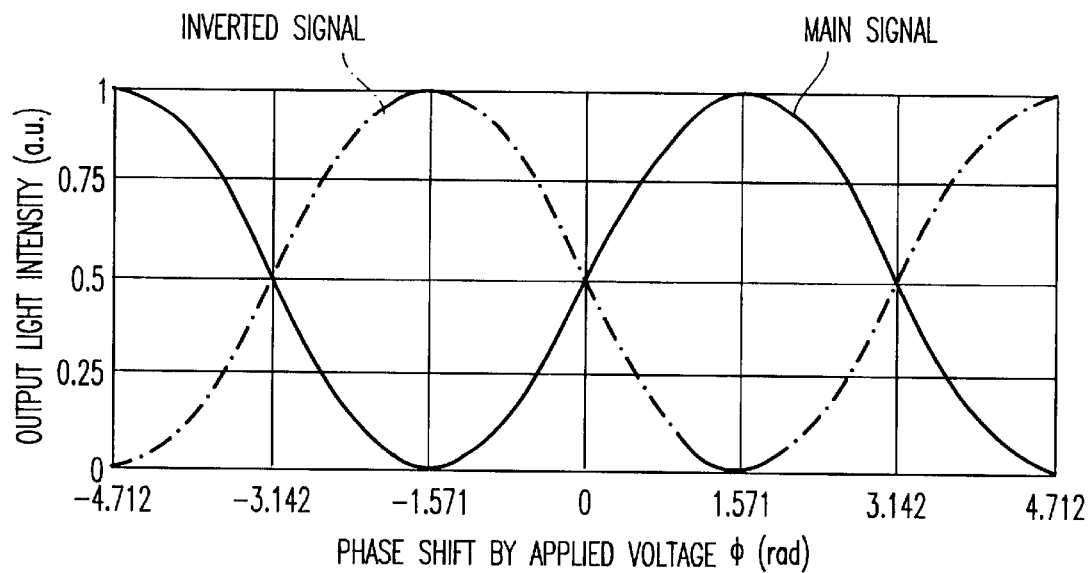
FIG. 5 is a waveform chart showing the change in the output light intensity with respect to the input signal voltage in the optical modulator shown in FIG. 3.

FIG. 5 shows the change in output light intensity with respect to the input signal voltage in this optical modulator. As shown in FIG. 5, the output light of output optical waveguide 12d is in an inverted relation to the output light of output optical waveguide 12e. The optical modulator is preferably set such that the output intensities of the output light of these output optical waveguides 12d and 12e are equal, i.e., are in a zero crossing state, at an input signal voltage of 0. By setting the optical modulator in this way, the initial operating point can be set in advance to a $\delta/2$ phase shift state.

In an optical modulator which uses a 3-dB directional coupler as shown in FIG. 3, the initial phase shift, deterioration of the extinction ratio, and optical loss are all related to: (a) the ratio of nonuniformity, which is represented by the difference in the propagation constants of the two optical waveguides that constitute the 3-dB directional coupler, to the coupling coefficient; and (b) shift in the coupling length of the two optical waveguides. This relation is next explained in more specific terms.

First, regarding the relation between the nonuniformity of the 3-dB directional coupler and the initial phase shift, the nonuniformity of 3-dB directional coupler 13 can be defined as follows;

If $\beta_a$ and $\beta_b$ represent the propagation constants of the two optical waveguides a and b, respectively, that constitute 3-dB directional coupler 13 (refer to FIG. 4), nonuniformity $\delta$ can be represented as:

$$\delta=(\beta_a-\beta_b)/2$$

Figure 6:
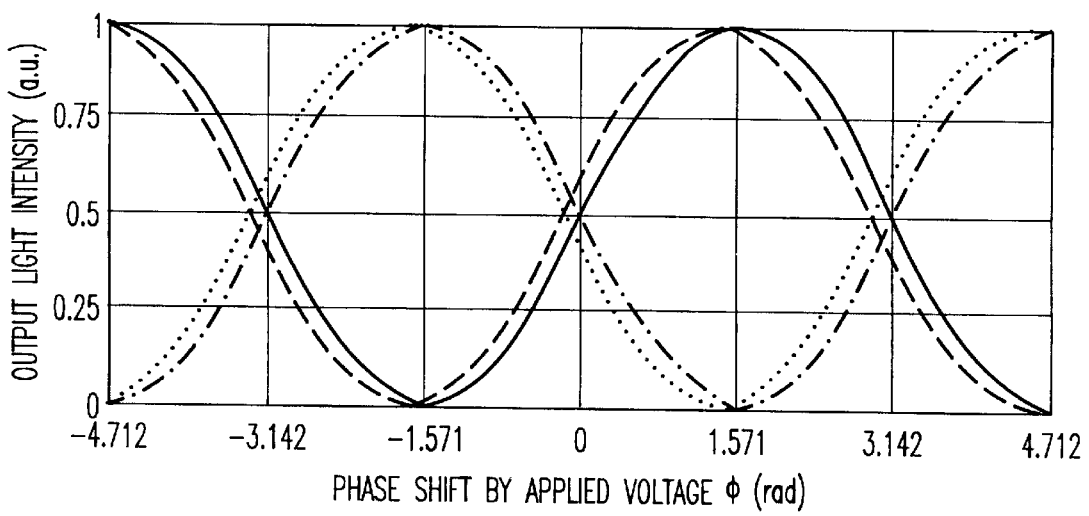
FIG. 6 is a view for explaining the relation between the nonuniformity of the 3-dB directional coupler and the change in the output light intensity with respect to the input signal voltage.

FIG. 6 shows the change in the intensity of output light with respect to the input signal voltage of the optical modulator when nonuniformity $\delta$ of 3-dB directional coupler is 0 and 0.2. In FIG. 6, the inverted signals (dot-and-dash line and dotted line) and main signals (solid line and broken line) show the change in the light output of output waveguides 12d and 12e, respectively. When nonuniformity $\delta$ is 0, a $\pi/2$ phase shift state, i.e., a zero crossing state, is established, but when nonuniformity $\delta$ is 0.2, the amount of phase shift diverges from $\pi/2$ and a zero crossing state is no longer maintained. Suitable modulation characteristics cannot be obtained when the zero crossing state is lost.

Figure 7:
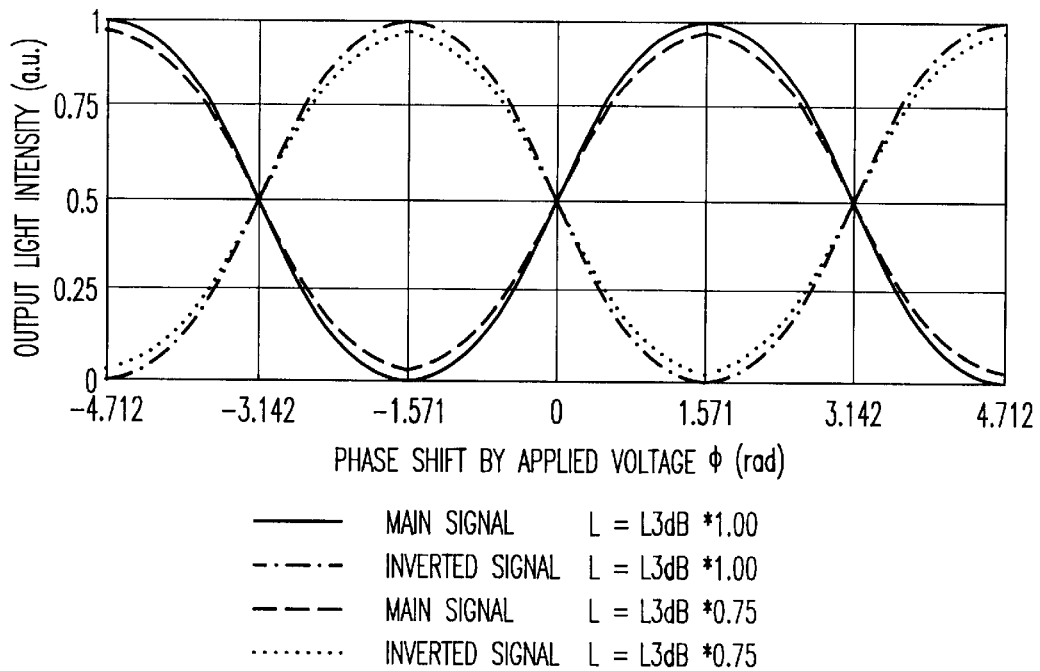
FIG. 7 is a view for explaining the relation between the coupling length of the 3-dB directional coupler and the change in the output light intensity with respect to the input signal voltage.
Figure 8:
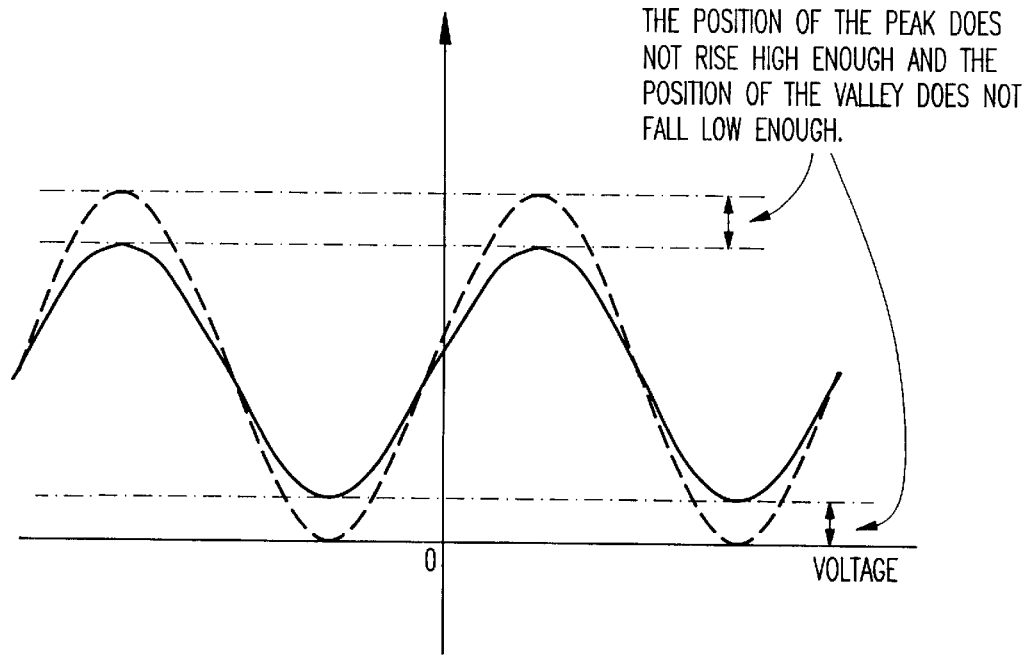
FIG. 8 is a view for explaining the relation between the shift in coupling length L and the change in output light intensity with respect to the input signal voltage.

Next, regarding the relation between the coupling length L of the 3-dB directional coupler and deterioration of the extinction ratio. In the case of a 3-dB directional coupler, 3-dB branching is carried out when the coupling length L of the two optical waveguides is a prescribed length. This prescribed length is referred to as "3-dB branch coupling length L3 dB." FIG. 7 shows the relation between the coupling length L and change in the output light intensity with respect to the input signal voltage of the optical modulator. In FIG. 7, the graph of the inverted signals (dot-and-dash line and dotted line) and the graph of the main signals (solid line and broken line) show the change in output light intensity of output optical waveguides 12d and 12e, respectively. A $\pi/2$ phase state, i.e., a zero crossing state, is obtained when the coupling length L matches the 3-dB branch coupling length L3 dB. A $\pi/2$ phase shift state (zero crossing state) is obtained even if the coupling length L diverges by as much as 25% from 3 dB branch coupling length L3 dB, but the amplitude of the output light decreases. In other words, phase shift does not occur despite divergence of the coupling length L from the 3 dB branch coupling length L3dB, but as shown in FIG. 8, the position of the peak does not rise high enough and the position of the valley does not fall low enough in the optical output curve, and extinction ratio deteriorates proportionally. Normally, there is a certain permissible range of deviation of coupling length L from 3 dB branch coupling length L3 dB when an extinction ratio characteristic of at least a prescribed value is obtained, and there is consequently a great degree of tolerance with respect to the divergence in the coupling length L and the design of the optical waveguide pastern.

As can be understood from the foregoing explanation, in an optical modulator that is provided with a 3-dB directional coupler, more attention should be paid to divergence of nonuniformity δ of 3-dB directional coupler than to divergence of the coupling length L in order to suppress initial phase shift and set the optical modulator to a suitable initial operating point.

Explanation is next presented regarding a suitable ratio between nonuniformity δ of the 3-dB directional coupler and the coupling coefficient κ thereof.

Figure 9:
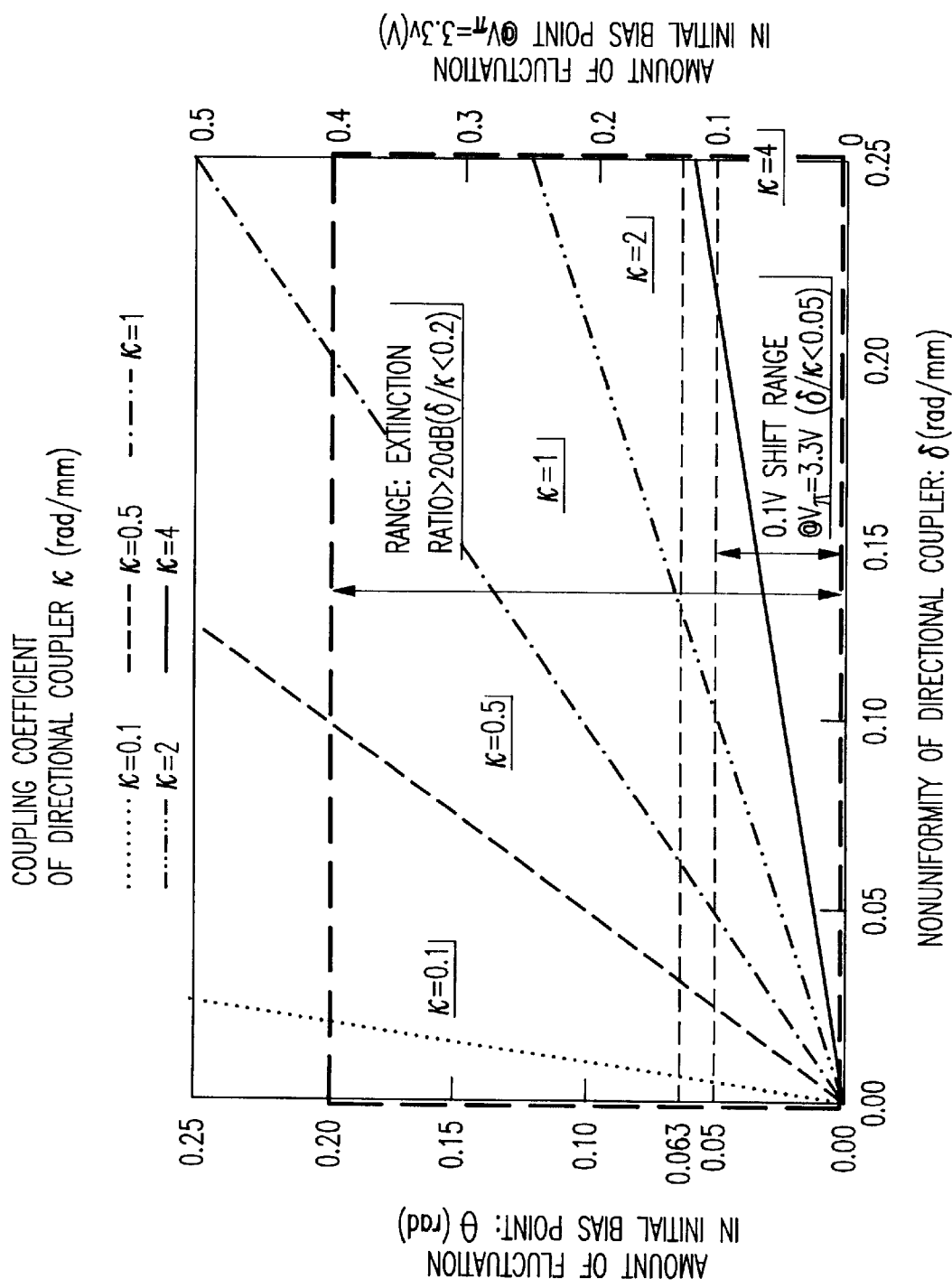
FIG. 9 is a chart showing the preferable ratio range of ratio $\delta/\kappa$ of nonuniformity $\delta$ of the 3-dB directional coupler to coupling coefficient $\kappa$ of the 3-dB directional coupler.

FIG. 9 shows the desired range of ratio δ/κ between nonuniformity δ and the coupling coefficient κ of the 3-dB directional coupler. Here, nonuniformity δ of the directional coupler is plotted on the horizontal axis, the amount of fluctuation in the initial bias point is shown by the amount of phase on the left vertical axis, and the amount of fluctuation in the initial bias point converted to voltage when the half-wavelength voltage (Vπ) is 3.3 V is shown on the right vertical axis. The coupling coefficient κ is here defined as follows: An even mode and an odd mode exist as mutually orthogonal normal modes in the areas of two optical waveguides that are arranged in proximity and that constitute a 3-dB directional coupler (i.e., optical waveguides a and b in FIG. 4). If the propagation constants of the even mode and odd mode are $\beta_e$ and $\beta_o$, respectively, the coupling coefficient κ is represented by:

$$\kappa = (\beta_e - \beta_o)/2$$

The amount of fluctuation in the initial bias on the vertical axis is preferably small. Nonuniformity δ is dependent on the uniformity within the wafer surface on the wafer that constitutes the optical substrate. Although an infinitely small value is preferable, nonuniformity that depends on the wafer itself or on the fabrication process will inevitably occur due to the actual limits of fabrication. In FIG. 9, nonuniformity δ on the horizontal axis indicates the permissible range for actual fabrication; and larger values indicate that greater tolerance is possible in the fabrication process. Thus, in the graph shown in FIG. 9, the area in the lower right represents the most desirable range of conditions. Furthermore, coupling coefficient κ varies in direct proportion to the amount of fluctuation in initial bias, the slope decreasing with increase in coupling coefficient κ. This means that as coupling coefficient κ increases, the tolerance with respect to nonuniformity δ in designing the optical waveguide pattern can also be increased.

FIGS. 10A to 10D are for explaining the tolerance with regard to ratio δ/κ of nonuniformity δ to the coupling coefficient κ with respect to deterioration in the extinction ratio. FIGS. 10A to 10C show the change in output light intensity with respect to input signal voltage in an optical modulator when δ/κ=0, 0.2, and 0.5, respectively; and FIG. 10D shows the relation between the extinction ratio and δ/κ. As can be understood from these figures, as ratio δ/κ increases, the amplitude of the change in output light intensity decreases, i.e., the difference in amplitude ΔA increases and the extinction ratio deteriorates. Since a practical extinction ratio that can obtain a suitable modulation characteristic is at least 20 dB, ratio δ/κ of nonuniformity δ to coupling coefficient κ must be 0.2 or less to obtain a practical extinction ratio with regard to the difference in amplitude.

As described in the foregoing explanation, regarding the problem of deterioration of the extinction ratio that is caused by difference in amplitude, the extinction ratio in the optical modulator of this embodiment can be set to 20 dB or more by making the ratio between nonuniformity δ of the 3-dB directional coupler and coupling coefficient κ 1 to at least 5.

Thus, it can be seen that a practical optical modulator can be obtained by making ratio δ/κ 1 to at least 5.

FIGS. 11A to 11D are for explaining the tolerance of ratio δ/κ of nonuniformity δ to the coupling coefficient κ regarding phase shift. FIGS. 11A to 11C show the change in output light intensity with respect to input signal voltage of the optical modulator when δ/κ=0, 0.063, and 0.2, respectively; and FIG. 11D shows the relation between the permissible amount of phase shift and the extinction ratio. As can be understood from these figures, as ratio δ/κ increases, the amount of phase shift (i.e., phase difference Δφ) of the change in output light increases and the extinction ratio deteriorates. With regard to phase difference, ratio δ/κ must be 0.063 or less to obtain a practical extinction ratio of at least 20 dB.

As described in the foregoing explanation with regard to the problem of deterioration of the extinction ratio that is caused by phase shift, the extinction ratio can be made 20 dB or greater by making the ratio of nonuniformity δ to coupling coefficient κ 1 to at least 15. Thus, a more practical optical modulator can be obtained by making ratio δ/κ 1 to at least 15.

Based on experience, it is known that high-quality optical communication can be realized by suppressing the initial phase shift to 3% or less. When the half-wavelength voltage (Vπ) is made 3.3 V, for example, the ratio of nonuniformity δ to coupling coefficient κ must be made 0.05 or less to suppress the amount of initial bias fluctuation to within ±3% (i.e., 0.1 V) (refer to FIG. 9). In other words, the initial phase shift can be suppressed to 3% or less by making ratio δ/κ 1 to at least 20. Divergence of the set coupling length has no effect on fluctuation of the bias point.

To summarize the above explanation, each of the ranges are shown by the three frames in FIG. 9.

Coupling coefficient κ is preferably large because increase of coupling coefficient κ allows increase in the permissible value for nonuniformity δ as well as increase in the tolerance in the design of the optical waveguide.

Figure 12:
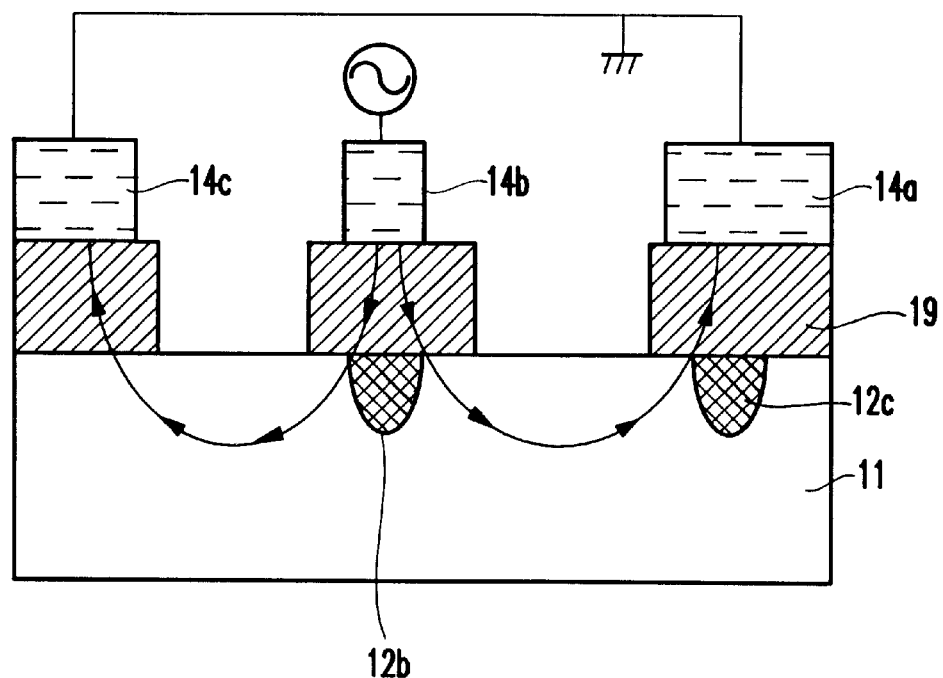
FIG. 12 is a schematic view showing the state of the electric field that is applied to the branch optical waveguides that make up the interference system in the optical modulator shown in FIG. 3.

In the optical modulator of this embodiment, travelling-wave electrode 14 is a configuration provided with first ground electrode 14a and second ground electrode 14c in symmetrical positions that together enclose signal electrode 14b. With this configuration, an electric field can be equally applied to branch optical waveguides 12b and 12c that constitute the Mach-Zehnder interference system as shown in FIG. 12, thus suppressing the charping phenomenon in the modulation output. The charping phenomenon is a minute fluctuation in wavelength of modulation optical over time that occurs when the modulation frequency is high. In this optical modulator, moreover, the degree of distortion of optical substrate 11 that occurs due to load in for example, the optical buffer layer or the electrodes of the upper structure of these branch optical waveguides 12b and 12c, can be made uniform, thereby preventing the occurrence of difference in the lengths of the optical paths in branch optical waveguides 12b and 12c brought about by stress Further, because a portion of electrode 14c is formed so as to overlie 3-dB directional coupler 13, the optical modulator of this embodiment can prevent the influence of disturbances such as temperature change or charging and thus offer stable operation. In this case, a construction is adopted in which a portion of electrode 14c overlies 3-dB directional coupler 13, but a construction may also be adopted in which 3-dB directional coupler 13 is simply covered by a conductive layer.

In this optical modulator, moreover, signal electrode 14b and ground electrode 14c are U-shaped patterns, and coaxial connectors 26 and 27 provided on respective ends of signal electrodes are configured to lead out in the same direction. Arranging coaxial connectors 26 and 27 in the same direction in this way eliminates the need for special connectors or restrictions in width in the package design, and improves the degree of freedom of design. In addition, this embodiment allows an improvement of workability when actually mounting the package and eliminates causes for decline of product yield.

Explanation is next presented regarding the actual configuration and fabrication steps of an optical modulator that can realize suitable conditions of the above-described ratio δ/κ of nonuniformity δ to coupling coefficient κ. In the examples described below, optical waveguides were fabricated by a titanium diffusion method using a z-cut y-axis propagating lithium niobate crystal substrate.

EXAMPLE 1

In the configuration shown in FIG. 3, a z-cut y-axis propagating lithium niobate crystal substrate is used for optical substrate 11. A titanium thin-film pattern that is 6–10 $\mu$m wide and 60–110 nm thick is formed on lithium niobate crystal substrate 11, following which optical waveguides 12 are formed by subjecting this titanium thin-film pattern to thermal diffusion for an interval of 6–15 hours in a gaseous atmosphere containing oxygen and water vapor (in some cases, containing inert gas such as nitrogen and argon) at a temperature of 950–1100° C.

Regarding the pattern of 3-dB directional coupler 13 that is formed as a portion of optical waveguides 12, if the light that is used has a wavelength in the, for example, 1.55 $\mu$m band, the gap between the two optical waveguides that constitute 3-dB directional coupler is preferably a maximum of 7 $\mu$m, and the coupling length is preferably a maximum of 10 mm.

Next, an optical buffer layer 19 composed of a silicon oxide ($SiO_2$) layer and having a thickness of 0.5–2.5 $\mu$m is formed on the surface of optical waveguides 12 using a known method such as a vacuum deposition method, a CVD (chemical vapor deposition) method, or a sputtering method. This optical buffer layer 19 is for effectively confining the light waves in optical wave guides 12. The refractive index of the silicon oxide layer is approximately 1.5, which is lower than the refractive index of titanium-diffused optical waveguides 12a–12e that constitute optical waveguides 12. In forming this optical buffer layer 19, a heat treatment at 500–800° C. is preferably carried out in an oxygen atmosphere to both compensate for oxygen loss and raise the electric resistance of the dielectric layer. Another material other than silicon oxide ($SiO_2$) may be used as optical buffer layer 19 as long as it is a dielectric having no absorption of the guided light and moreover, having a lower refractive index than substrate 11. Examples of such a material include aluminum oxide ($Al_2O_3$) and indium tin oxide (ITO).

An underlying metallic layer is next formed by patterning metallic layers (for example, titanium-gold) in a desired form having a thickness of, for example, 0.1 $\mu$m and a line width of 6–12 $\mu$m on optical buffer layer 19 and optical substrate 11 using a photolithographic technique and a thin-film formation technique, following which electrodes 14a to 14c are formed by filling out to a thickness of 10–40 $\mu$m using a gold plating technique, thereby completing the optical modulation device.

EXAMPLE 2

In this example as well, a z-cut y-axis propagating lithium niobate crystal substrate is used as optical substrate 11 in the optical modulator shown in FIG. 3. A photoresist is first applied to optical substrate 11 of lithium niobate crystal, and a prescribed resist pattern is formed by an exposure technique. This resist pattern is for forming the pattern of the input/output portions of optical waveguide 12, i.e., linear optical waveguides 12a, 12d, and 12e; and optical waveguides 12b and 12c that constitute the interference system, and is a shape that can form a waveguide pattern having a width of 7 $\mu$m. This resist pattern is also a shape that can form an optical waveguide pattern in which two linear patterns spaced 2 $\mu$m apart are adjacent over a length of 1.3 mm in the directional coupler 13 portion, which is the terminal portion of the interference system.

After forming the resist pattern, a titanium thin-film having a thickness of 84 nm is deposited over the resist pattern by a sputtering method. The resist pattern is lifted off using an organic solvent such as acetone, and an optical waveguide pattern is formed from the titanium thin-film. This optical waveguide pattern undergoes thermal diffusion at 1045° C. in an oxygen atmosphere containing water vapor for eight hours to fabricate single-mode titanium diffusion optical waveguides (i.e., optical waveguides 12).

Next, optical buffer layer 19 composed of a silicon oxide layer having a thickness of 0.9 $\mu$m is formed by a CVD method on the surface of optical waveguides 12, following which a heat treatment at 700° C. is carried out in an oxygen atmosphere for eight hours to repair composition deficiencies of the silicon oxide layer. Metallic thin-films composed of titanium and gold are next formed using an evaporation method to thicknesses of 0.02 $\mu$m and 0.1 $\mu$m, respectively, on substrate 11, on which optical buffer 19 is formed; following which an exposure technique is used to fort an electrode pattern in which the electrode spacing is 26 $\mu$m and the line width of the electrode is 9 $\mu$m. A resist is then applied on this electrode pattern, and an exposure technique is again used to leave an electrode pattern of a specific shape, thus forming a resist pattern having a total thickness of approximately 30 $\mu$m. This resist pattern is then used as a mask to form electrodes that are thickened to a thickness of 26 $\mu$m on the above-described electrode pattern by a gold electroplating method, following which the resist pattern is removed to complete travelling-wave electrode 14.

Second Embodiment:

In the above-described first embodiment of the optical modulator, a configuration was adopted in which light that is propagated by two optical waveguides that constitute the interference system is coupled by a 3-dB directional coupler, but a 2×2-port multimode interference (MMI) optical waveguide can be used in place of this 3-dB directional coupler. An optical modulator that uses an MMI waveguide is next explained.

Figure 13:
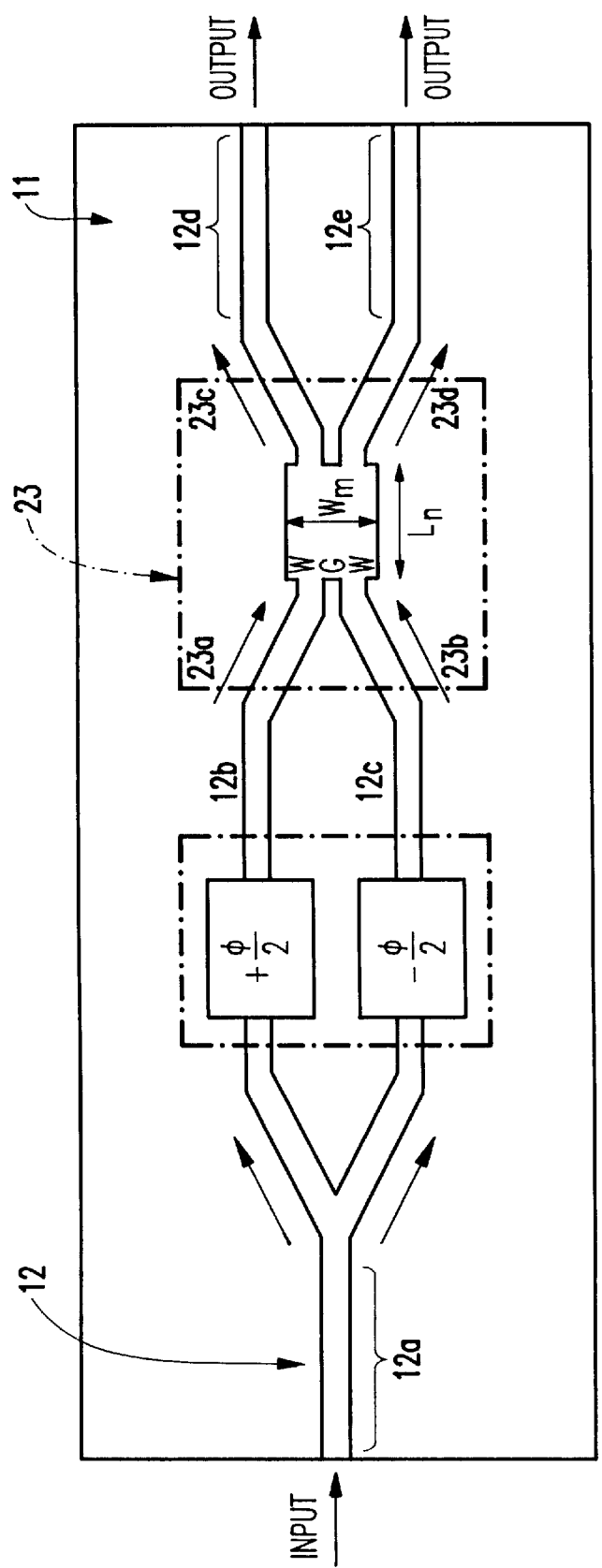
FIG. 13 is a schematic structural view of the optical modulator provided with a MMI (multimode interference) waveguide according to the second embodiment of the present invention.

Referring to FIG. 13, the configuration of an optical modulator is shown that is provided with this type of MMI waveguide. Constituent elements in FIG. 13 that are the same as constituent elements shown in FIG. 3 are given the same reference numerals, and detailed explanation of these constituent elements is not repeated here.

In the optical modulator shown in FIG. 13, as with the device shown in FIG. 3, a configuration is adopted in which optical waveguides 12 are provided in the surface of optical substrate 11, which has an electro-optical effect, and optical buffer layer 19 and travelling-wave electrode 14 of a prescribed pattern are further formed over optical waveguides 12. Optical waveguide 12 is a Mach-Zehnder interference system waveguide having a configuration in which input optical waveguide 12a is split into branch optical waveguides 12b and 12c by way of a waveguide of Y-branching structure, and these branch optical waveguides 12b and 12c are then coupled at 2-input 2-output MMI optical waveguide 23 and connected to output optical waveguides 12d and 12e. This MMI optical waveguide 23 has, for example, an optical waveguide width w of 6–9 μm and an optical waveguide gap G of 10–25 μm, and the multi-mode optical waveguide portion which has width Wm of 28–45 μm and length Lm of 2–6 μm. In addition to these components, this optical modulator is also provided with the travelling-wave electrodes and circuits for modulation that were described in the first embodiment, although these components are not shown in FIG. 13.

An MMI waveguide typically has the following three characteristics: (a) branching and separation into light waves of equal power having a branching ratio 50:50; (b) high fabrication tolerance; and (c) low wavelength dependency. As can be understood from the description in "Compact MMI coupler using Ti:LiNbO$_3$" (4a-ZB-8 of Preliminary Papers of the 58th Conference of the Japan Society of Applied Physics, October 1997, p. 1117), an MMI waveguide has the advantages of being amenable to design by analytic computation and allowing greater tolerance in fabrication than a directional coupler.

Figure 14:
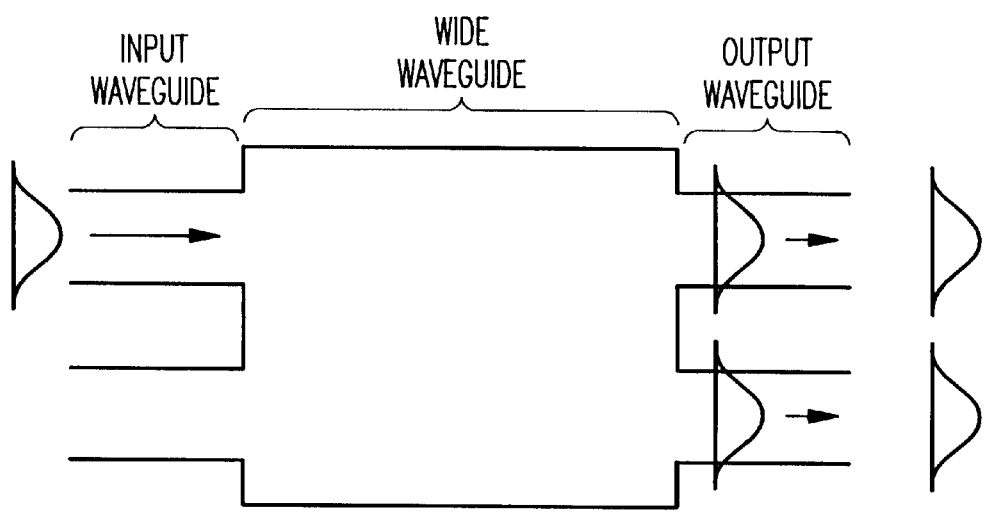
FIG. 14 is a view for explaining the operation principles of an MMI waveguide.

FIG. 14 is a view for explaining the operation principles of a 2-input 2-output MMI waveguide. An MMI waveguide converts single-mode light waves that are received from one narrow input waveguide to a multimode (high-order mode) in a wide portion of the optical waveguide, and then smoothly converts to a single mode by causing the first result of conversion to gradually approach the field distribution of two output waveguides, thereby branching and separating the input light waves into light waves of equal power.

In MMI waveguide 23 shown in FIG. 13, light waves that are received from branch optical waveguide 12b are branched and separated into light waves of equal power at the same time that light waves that are received from branch waveguide 12c are branched and separated into light waves of equal power. These branched and separated light waves are combined and outputted from each output waveguide of MMI waveguide 23.

Typically, in an optical modulator having a Mach-Zehnder interference system waveguide configuration, a considerable amount of light emits from the Y-branching portion, and it is believed that this emission is again coupled in the optical combining-coupling unit and adversely influences the modulation characteristic. In a device in which optical combining-coupling unit is constituted by an MMI waveguide as in the optical modulator of this embodiment, the influence of the light emission is reduced in the wide optical waveguide portion (multi-mode portion) of the MMI waveguide, and the communication quality is therefore improved.

In this optical modulator, moreover, a portion of electrode 14c is formed so as to overlie MMI waveguide 23, and the present embodiment therefore can prevent the influence of disturbance such as temperature change or charging and can offer stable operation as in the previously described first embodiment. Although a configuration is here adopted in which a portion of electrode 14c overlies MMI waveguide 23, a similar effect can be obtained by simply covering MMI waveguide 23 with a grounded conductive layer.

In the above-described first embodiment and second embodiment of the optical modulator, there are two causes for the occurrence of temperature drift: the occurrence of polarization charge due to a pyroelectric effect and/or a piezoelectric effect as described hereinabove; and the occurrence of a difference in the optical path lengths of the branch optical waveguides due to stress. An embodiment that can solve the problem of temperature drift arising from these factors is next described.

Figure 15A:
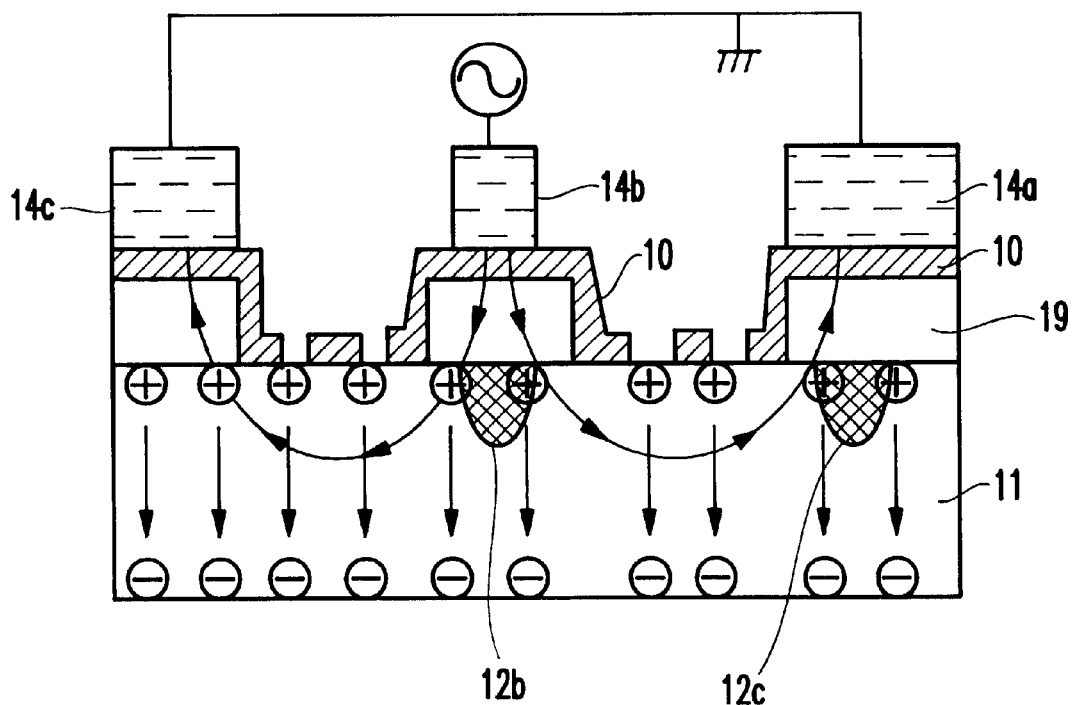
FIG. 15A is a sectional view for explaining the construction of the optical modulator according to the third embodiment of the present invention.
Figure 15B:
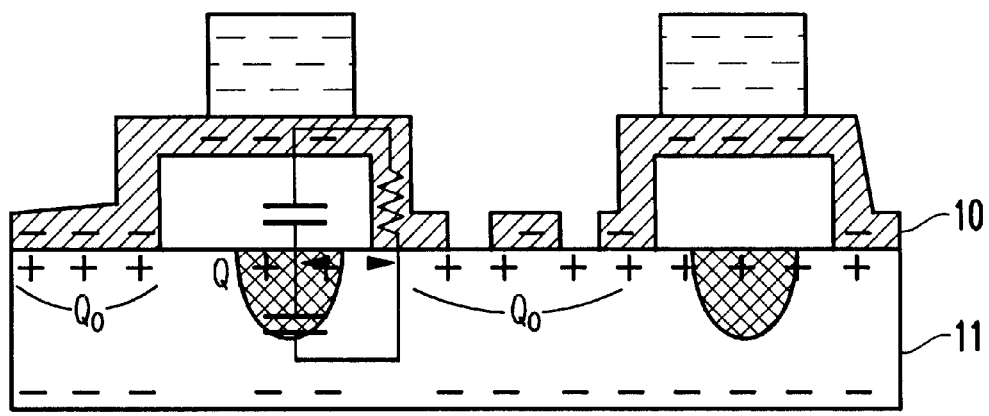
FIG. 15B is a schematic view showing the state of the polarization charge in the optical modulator shown in FIG. 15A.

Third Embodiment:

We refer now to FIGS. 15A and 15B, which show the optical modulator according to the third embodiment of the present invention. In FIGS. 15A and 15B, constituent elements that are the same as constituent elements shown in FIG. 3 are given the same reference numerals as in FIG. 3, and detailed explanation of these constituent elements is not repeated here.

With the exception of the provision of silicon film 10, the optical modulator of the third embodiment has the same configuration as the first and second embodiments. Branch optical waveguides 12b and 12c and optical buffer layer 19 are formed on the surface of optical substrate 11, and silicon film 10 is formed so as to substantially cover the exposed surface of optical buffer layer 19 and optical substrate 11. Electrodes 14a–14c are formed on optical buffer layer 19 with silicon film 10 interposed. With this configuration, positive polarization charging that occurs on the surface of optical substrate 11 at points where the surface of optical substrate 11 directly contacts silicon film 10 as shown in FIG. 15B is canceled by the negative charging that occurs on the silicon film 10 side, with the result that the occurrence of polarization charging is suppressed by silicon film 10. This configuration thus suppresses the effect of polarization charging on the electric field that is applied to the two branch optical waveguides 12b and 12c that constitute the Mach-Zehnder interference system and allows an improvement of the stability of the modulation characteristics.

Figure 16:
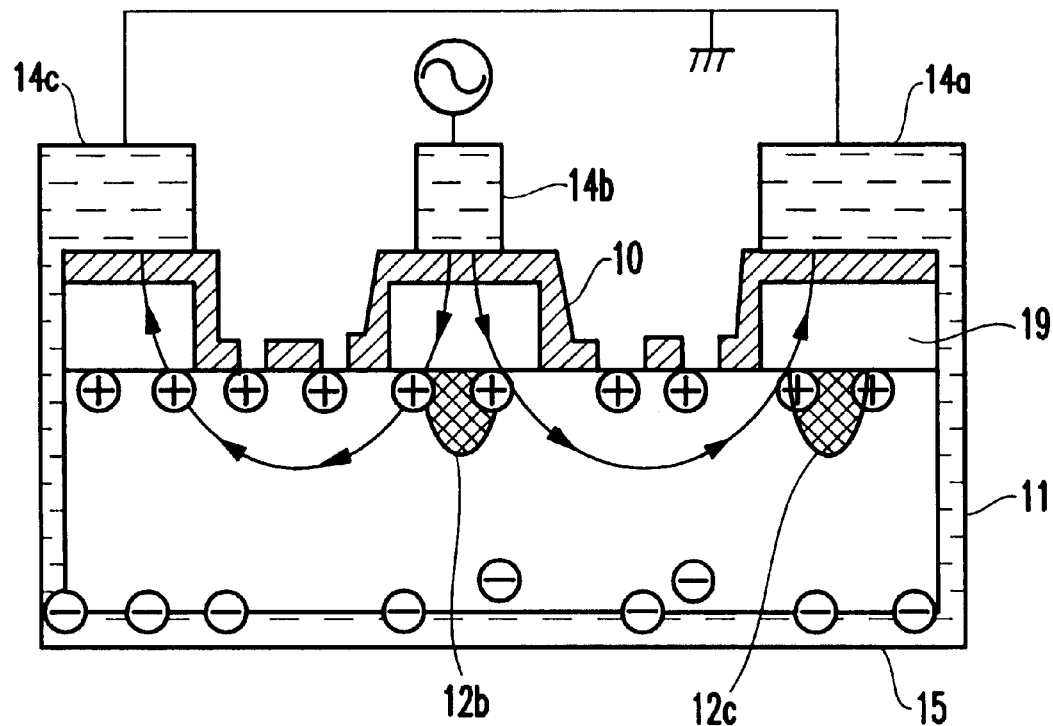
FIG. 16 is a sectional view of the optical modulator according to the fourth embodiment of the present invention.

Fourth Embodiment:

Turning now to the optical modulator of the fourth embodiment of the present invention, constituent elements in FIG. 16 that are the same as shown in FIG. 3 are given the same reference numerals as in FIG. 3, and detailed explanation regarding these constituent elements is not repeated here.

Apart from the formation of conductive film 15 on the side and back surfaces of optical substrate 11, this optical modulator has the same configuration as the previously described third embodiment. Conductive film 15 is in electrical contact with ground electrodes 14a and 14c. With this configuration, not only is the occurrence of positive polarization charging suppressed by silicon film 10 as in the above-described third embodiment, but the occurrence of polarization charging can be more effectively suppressed than in the above-described third embodiment because the back surface of optical substrate 11 upon which negative polarization charging occurs is in electrical contact with ground by way of conductive film 15.

The occurrence of polarization charging can be suppressed to some extent even in a case in which only conductive film 15 is provided and silicon film 10 is absent.

Figure 17:
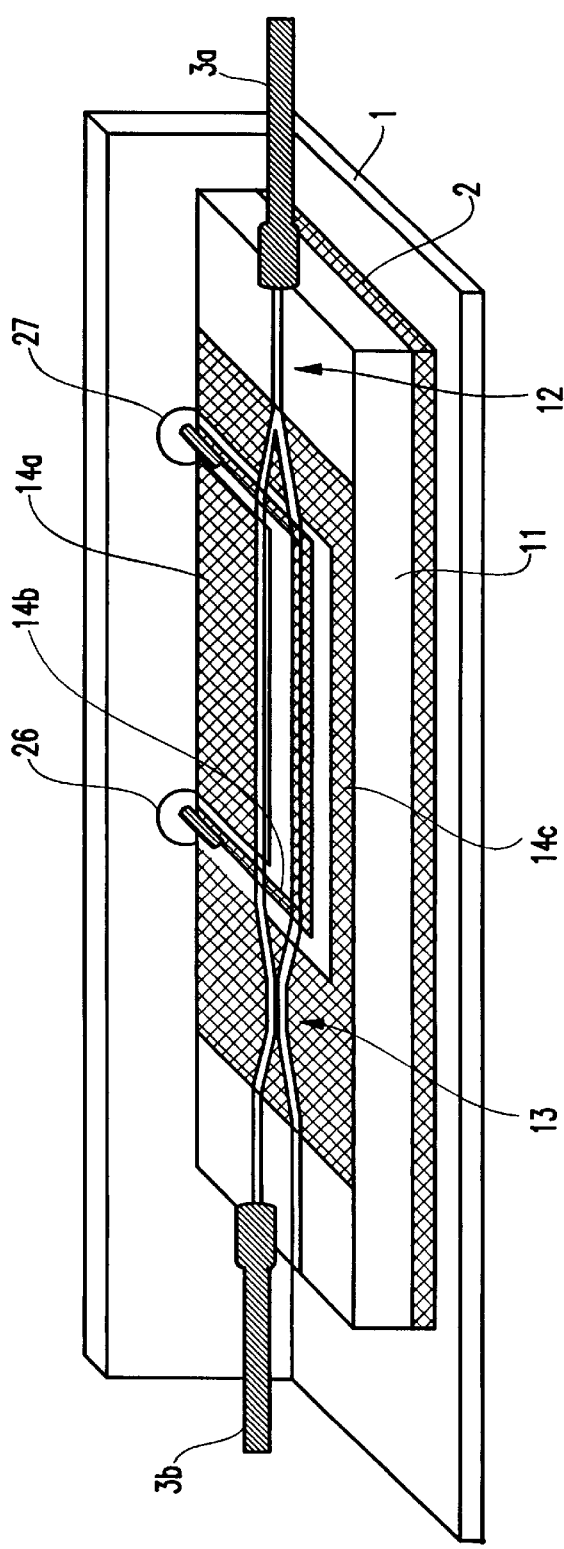
FIG. 17 is a view showing one example of the fixing construction in the optical modulator according to the fifth embodiment of the present invention.

Fifth Embodiment:

We turn now to the optical modulator of the fifth embodiment of the present invention. In FIG. 17, which shows an example of the fixing structure in this optical modulator, constituent elements that are the same as those shown in FIG. 3 are given the same reference numerals as in FIG. 3, and detailed explanation of these constituent elements is not repeated here.

The optical modulator shown in FIG. 17 is of a construction in which the back surface of optical substrate 11 of the optical modulator shown in FIG. 3 is fixed to case 1 by way of joining portion 2. The input waveguide of optical waveguide 12 that is formed in the surface of optical substrate 11 is coupled with optical fiber 3a, and one of the output waveguides is coupled with optical fiber 3b. Joining portion 2 is composed of a conductive joining material or an adhesive joining material in a soft state.

If joining portion 2 is constituted by an adhesive joining material in a soft state, joining portion 2 eases stress that occurs in optical substrate 11 as a result of the difference in the thermal expansion coefficients of optical substrate 11 and case 1. Alternatively, if joining portion 2 is constituted by a conductive joining material, the occurrence of polarization charging can be suppressed to some degree as in the above-described fourth embodiment because the back surface of optical substrate 11 on which negative polarization charging occurs is electrically connected to case 1 (i.e., grounding point) by way of joining portion 2.

Figure 18:
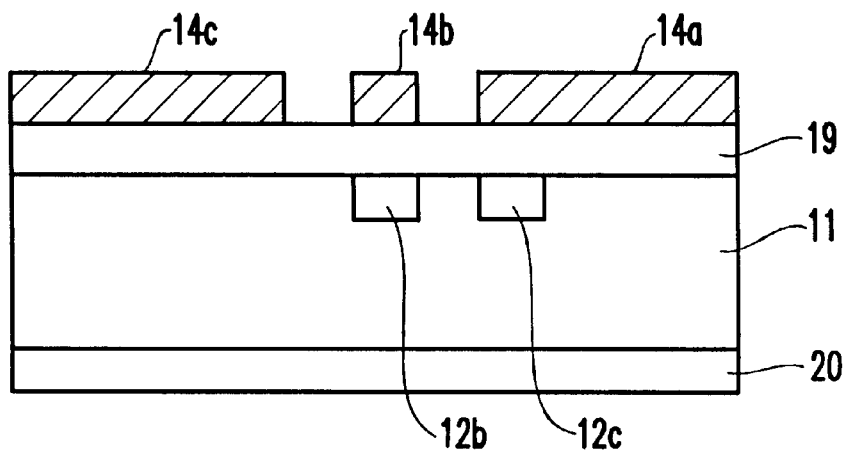
FIG. 18 is a sectional view of the optical modulator that is provided with a symmetrical structure according to the sixth embodiment of the present invention.

Sixth Embodiment:

Explanation next regards an optical modulator provided with a symmetrical configuration as the sixth embodiment of the present invention. Referring now to FIG. 18, which shows the optical modulator of the sixth embodiment, constituent elements that are the same as those shown in FIG. 3 are given the same reference numerals as in FIG. 3, and detailed explanation of these constituent elements is not repeated here.

Other than the provision of silicon oxide ($SiO_2$) film 20 on the back surface of optical substrate 11, this optical modulator has the same construction as the optical modulator shown in FIG. 3. Silicon oxide film 20 is composed of the same material and has the same thickness as optical buffer layer 19. With this configuration, stress that occurs in optical substrate 11 as a result of the temperature dependency of internal stress that is caused by the formation of optical buffer layer can be made substantially equal for the front surface and back surface of optical substrate 11. This configuration therefore can suppress change in the refractive index that accompanies stress in the two branch optical waveguides 12b and 12c that constitute the Mach-Zehnder Interference system, and can maintain stable modulation characteristics.

In each of the embodiments described hereinabove, explanation regarded cases using z-cut y-axis propagating lithium niobate crystal substrates, but the present invention can also be applied in an optical modulator that uses an optical substrate having other crystal face orientations (for example, x-cut y-axis propagating). Furthermore, although lithium niobate was used as the substrate, the present invention allows the use of dielectric materials or semiconductor materials as the substrate as long as the material possesses an electro-optical effect.

Figure 19:
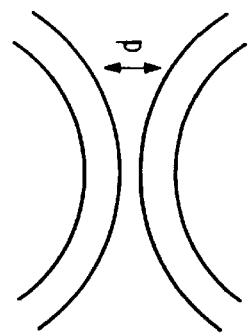
FIG. 19 shows an example of the configuration of the optical waveguides that make up the 3-dB directional coupler.

In addition to the coupler having a construction in which the gap between the adjacent optical waveguides is fixed as shown in FIG. 3, the present invention allows the use of a 3-dB directional coupler having a coupler structure with weighted coupling as shown in FIG. 19 in which the distance d between the adjacent optical waveguides varies according to a specific function and in which the coupling coefficient varies spatially. In such a case, the wavelength dependency, polarization dependency, and coupling length dependency of the 3-dB directional coupler can be relaxed.

Figure 20:
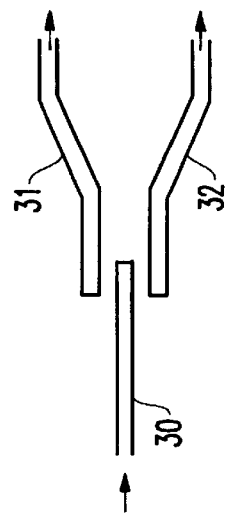
FIG. 20 shows an example of the configuration of a multi-stage directional coupler.

In addition, a multi-stage directional coupler such as shown in FIG. 20 can be used in place of the input-side Y-branching structure of optical waveguide 12. This multi-stage directional coupler is composed of one input optical waveguide 30 and two output optical waveguides 31 and 32. Each of optical waveguides 30–32 are separated from each other, the end of input optical waveguide 30 and the ends of output optical waveguides 31 and 31 being arranged in proximity to constitute an approximately Y-shaped coupler. This structure enables a decrease in excess loss in comparison with the Y-branching structure, and variation in the branching ratio caused by divergence of the position of incidence of the fiber can also be decreased.

Figure 21:
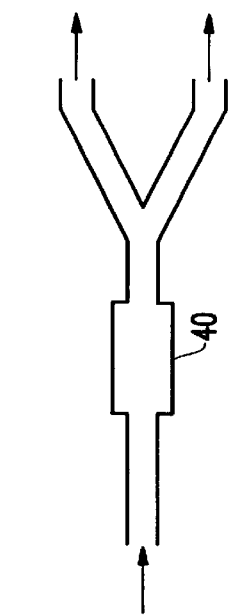
FIG. 21 shows an example of the configuration of the Y-branch structure that can be applied in the optical modulator of the present invention.

The Y-branching structure on the input side of optical waveguide 12 may also be a construction provided with mode filter 40 in the input optical waveguide as shown in FIG. 21. With this construction, input light can be converted to single mode before incidence to the Y-branching portion because multi-mode input light is converted to single-mode by mode filter 40. This construction enables ideal branching, i.e., a branching ratio of 1:1.

Next, regarding the optical modulation method that uses the optical modulator of each of the above-described embodiments.

In an optical modulator that uses a 3-dB directional coupler, a main (non-inverted) signal is outputted from one output optical waveguide and an inverted signal is outputted from the other output optical waveguide. The optical modulation method of the present invention takes advantage of the mutually reversed phase relation of these optical outputs (i.e., main signal and inverted signal) to extract and use either one of the optical outputs, or to extract and use both of the optical outputs, this being a special feature of this method. This method can also be applied in an optical modulator that uses a 2-input 2-output MMI (multimode interference) optical waveguide. The utility in the case of using this MMI optical waveguide is particularly high because optical outputs of equal power with a branching ratio of 50:50 can be obtained from each output optical waveguide.

Although preferred embodiments of the present invention have been described above, it goes without saying that each portion of the construction, control, or a combination can be modified without departing from the spirit or scope of the present invention. In the foregoing explanation, an example of application to a light intensity modulator was described, but it goes without saying that various other optical functional devices can be realized using the Mach-Zehnder optical waveguide structure according to the present invention.

What is claimed is:

1. An optical modulator comprising:
    a substrate having an electro-optical effect;
    first and second branch optical waveguides formed in a first major surface of said substrate;
    an optical branching structure for splitting an input optical signal into two split signals and supplying said split signals to said first and second branch optical waveguides, respectively; and
    a 3-dB directional coupler which is connected to said first and second branch optical waveguides and which couples outputs of said first and second branch optical waveguides;
    wherein a ratio of nonuniformity, which is represented by a difference between propagation constants of two optical waveguides constituting said 3-dB directional coupler, to a coupling coefficient of said 3-dB directional coupler is 1 to at least 5.

2. An optical modulator according to claim 1, comprising a first ground electrode provided over said first branch optical waveguide and a signal electrode provided over said second branch optical waveguide.

3. An optical modulator according to claim 2, comprising a second ground electrode provided at a position symmetrical with said first ground electrode such that said signal electrode is interposed between said first and second ground electrodes.

4. An optical modulator according to claim 3 wherein a portion of said second ground electrode is formed over the optical waveguides of said 3-dB directional coupler.

5. An optical modulator according to claim 3, further comprising connectors which are provided on both ends of said signal electrode and configured to lead out in a same direction.

6. An optical modulator according to claim 2, further comprising a conductive film formed on a second major surface and/or a side surface of said substrate.

7. An optical modulator according to claim 2, further comprising a joining portion which can join with a case, said joining portion being constituted by a conductive joining material or by a joining material which can bond in a soft state.

8. An optical modulator according to claim 2, further comprising;
an optical buffer layer for containing light waves provided over said first and second branch optical waveguides; and
a film of a same thickness and a same material as said optical buffer layer, said film provided on a second major surface of said substrate.

9. An optical modulator according to claim 2 wherein said ratio is 1 to at least 15.

10. An optical modulator according to claim 9 wherein said ratio is 1 to at least 20.

11. An optical modulator according to claim 1 wherein said ratio is 1 to at least 15.

12. An optical modulator according to claim 11 wherein said ratio is 1 to at least 20.

13. An optical modulator comprising:
a substrate having an electro-optical effect;
first and second branch optical waveguides formed in a first major surface of said substrate;
an optical branching structure for splitting an input optical signal into two split signals and supplying said split signals to said first and second branch optical waveguides, respectively;
a 2-input 2-output multi-mode interference optical waveguide connected to output ends of said first and second branch optical waveguides, wherein said multi-mode interference optical waveguide converts received light waves from single-mode to multi-mode;
a first ground electrode provided over said first branch optical waveguide;
a signal electrode provided over said second branch optical waveguide; and
a second ground electrode provided in a position that is symmetrical to said first ground electrode such that said signal electrode is interposed between said first and second ground electrodes.

14. An optical modulator according to claim 13, wherein a portion of said second ground electrode is formed over said multi-mode interference optical waveguide.

15. An optical modulator according to claim 13, further comprising a conductive film formed on a second major surface and/or a side surface of said substrate.

16. An optical modulator according to claim 13, further comprising a joining portion which can join with a case, said joining portion being constituted by a conductive joining material or by a joining material which can bond in a soft state.

17. An optical modulator according to claim 13, further comprising:
an optical buffer layer for containing light waves provided over said first and second branch optical waveguides; and
a film of a same thickness and a same material as said optical buffer layer, said film provided on a second major surface of said substrate.

18. An optical modulator according to claim 13, further comprising connectors which are provided on both ends of said signal electrode and configured to lead out in a same direction.

19. An optical modulator comprising:
a substrate having an electro-optical effect;
first and second branch optical waveguides formed on a first main surface of said substrate;
an optical branching structure for splitting an input optical signal into two split signals and supplying said split signals to said first and second branch optical waveguides, respectively;
a 3-dB directional coupler which is connected to said first and second branch optical waveguides and which couples outputs of said first and second branch optical waveguides;
a first ground electrode provided over said first branch optical waveguide;
a signal electrode provided over said second branch optical waveguide; and
a second ground electrode provided in a position that is symmetrical to said first ground electrode such that said signal electrode is interposed between said first and second ground electrodes.

20. An optical modulator according to claim 19, wherein a portion of said second ground electrode is formed over the optical waveguide of said 3-dB directional coupler.

21. An optical modulator according to claim 20, further comprising a conductive film formed on at least one of a second major surface and a side surface of said substrate.

22. An optical modulator according to claim 20, further comprising a joining portion which can join with a case, said joining portion including a conductive joining material or a joining material which can bond in a soft state.

23. An optical modulator according to claim 20, further comprising:
an optical buffer layer for containing light waves provided over said first and second branch optical waveguides; and
a film of a same thickness and a same material as said optical buffer layer, said film being provided on a second major surface of said substrate.

24. An optical modulator according to claim 20, further comprising connectors which are provided on both ends of said signal electrode and configured to lead out in a same direction.

* * * * *